United States Patent

Iwase

(10) Patent No.: US 9,728,819 B2
(45) Date of Patent: Aug. 8, 2017

(54) NON-AQUEOUS ELECTROLYTE SECONDARY BATTERY SYSTEM

(71) Applicant: TOYOTA JIDOSHA KABUSHIKI KAISHA, Toyota-shi, Aichi (JP)

(72) Inventor: Kosuke Iwase, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 125 days.

(21) Appl. No.: 14/946,016

(22) Filed: Nov. 19, 2015

(65) Prior Publication Data

US 2016/0181673 A1 Jun. 23, 2016

(30) Foreign Application Priority Data

Dec. 23, 2014 (JP) ................................. 2014-259575

(51) Int. Cl.
*H02J 7/00* (2006.01)
*H01M 10/44* (2006.01)
*H01M 10/42* (2006.01)
*H01M 10/052* (2010.01)

(52) U.S. Cl.
CPC ....... *H01M 10/443* (2013.01); *H01M 10/425* (2013.01); *H02J 7/0029* (2013.01); *H01M 10/052* (2013.01); *H01M 2220/20* (2013.01); *H02J 7/007* (2013.01); *H02J 7/0068* (2013.01); *H02J 2007/0039* (2013.01); *Y02E 60/122* (2013.01)

(58) Field of Classification Search
CPC .......... H01M 10/443; H02J 7/04; H02J 7/007; H02J 7/029

USPC ...................... 320/148–150, 153; 429/61–62
See application file for complete search history.

(56) References Cited

U.S. PATENT DOCUMENTS

| | | | |
|---|---|---|---|
| 2006/0159984 A1* | 7/2006 | Nagayama | H01M 2/105 429/61 |
| 2007/0059587 A1* | 3/2007 | Kishi | H01M 10/0568 429/62 |
| 2015/0255998 A1* | 9/2015 | Hasegawa | H02J 7/04 320/107 |

FOREIGN PATENT DOCUMENTS

| | | |
|---|---|---|
| JP | 2006-155916 A | 6/2006 |
| JP | 2009-199934 A | 9/2009 |
| JP | 2010-218900 A | 9/2010 |

* cited by examiner

*Primary Examiner* — Paul Dinh
(74) *Attorney, Agent, or Firm* — Sughrue Mion, PLLC (57) ABSTRACT

A non-aqueous electrolyte battery system includes a battery voltage output section for outputting a voltage of a non-aqueous electrolyte secondary battery and a freezing determination section for performing freezing determination to a non-aqueous electrolyte. In the freezing determination, the freezing determination section executes freezing determination current control for supplying a current at a freezing determination current value at a freezing determination time in a direction to charge the non-aqueous electrolyte secondary battery. When a voltage value output from the battery voltage output section exhibits a transition that rises once to a peak value during execution of the freezing determination current control, and then decreases with time, it is determined that the non-aqueous electrolyte is in a frozen state.

12 Claims, 6 Drawing Sheets

30: CHARGE/DISCHARGE CONTROL SECTION
40: FREEZING DETERMINATION SECTION
41: DETERMINATION CURRENT APPLYING SECTION
50: TEMP. OUTPUT SECTION
45: VOLTAGE DETECTING SECTION
55: TEMP. DETECTING SECTION

NON-AQUEOUS ELECTROLYTE SECONDARY BATTERY SYSTEM

CROSS-REFERENCE TO RELATED APPLICATIONS

This application is based upon and claims the benefit of priority from the prior Japanese Patent Application No. 2014-259575 filed on Dec. 23, 2014, the entire contents of which are incorporated herein by reference.

BACKGROUND OF THE INVENTION

1. Field of the Invention

The present invention relates to a non-aqueous electrolyte battery system and more particularly to a non-aqueous electrolyte battery system capable of detecting that an electrolyte is frozen.

2. Description of Related Art

A non-aqueous electrolyte secondary battery, typified by a lithium ion secondary battery, is configured such that a positive electrode sheet, a negative electrode sheet, and a non-aqueous electrolyte are contained in a battery case. During charge/discharge of the lithium ion secondary battery, electric charges are transferred between the positive electrode sheet and the negative electrode sheet through the non-aqueous electrolyte. Herein, when the lithium ion secondary battery is placed at an environmental temperature below a freezing point of the non-aqueous electrolyte, the non-aqueous electrolyte may be frozen in some cases.

While the non-aqueous electrolyte freezes, it is preferable to restrict the use of the lithium ion secondary battery. The reason is because, for instance, when charging of the lithium ion secondary battery is carried out while the non-aqueous electrolyte is frozen, lithium may be deposited on the negative electrode sheet, leading to deterioration of battery performance of the battery. Accordingly, a system for controlling the use of the lithium ion secondary battery is preferably arranged to appropriately detect that the non-aqueous electrolyte is frozen.

For instance, Japanese patent publication application No. 2006-155916 discloses a technique for detecting that the electrolyte is in a frozen state when an open circuit voltage of the battery rises while the battery temperature decreases.

Meanwhile, the foregoing conventional technique is a technique for detecting that the electrolyte is in the frozen state at the time when freezing of the electrolyte occurs. Specifically, the aforementioned conventional technique is not directed to detecting whether or not the state of the electrolyte at any given point in time is a frozen state. However, freezing of the non-aqueous electrolyte is likely to occur during a non-use period in which charging and discharging of a lithium ion secondary battery are not performed. It is therefore preferable to appropriately detecting whether or not the non-aqueous electrolyte is in a frozen state at the time when the use of the lithium ion secondary battery is enabled to start after the non-use period.

It is therefore conceivable for example to detect the frozen state of the non-aqueous electrolyte when becomes frozen and further estimate whether or not the frozen state has been eliminated based on for example a temperature transition and an elapsed time from when the electrolyte freezes. However, for the non-aqueous electrolyte, the time required up to freezing and the time required from freezing to melting may be different. Further, depending on a residual charging capacity and others, the temperature and others at which freezing and melting are caused may be different. Therefore, for the method for detecting the time when the non-aqueous electrolyte becomes frozen, it is unlikely to accurately detect whether or not the state of the non-aqueous electrolyte at any given point in time corresponds to the frozen state.

The present invention has been made to solve the foregoing problems of the conventional techniques and has a purpose to provide a non-aqueous electrolyte battery system capable of accurately detecting that a non-aqueous electrolyte of a non-aqueous electrolyte secondary battery is in a frozen state.

SUMMARY OF THE INVENTION

One aspect of the invention to achieve the above purpose provides a non-aqueous electrolyte battery system including: a non-aqueous electrolyte secondary battery provided with a non-aqueous electrolyte; and a charge/discharge control section configured to execute charging control for controlling charging of the non-aqueous electrolyte secondary battery and discharging control for discharging of the non-aqueous electrolyte secondary battery, wherein the non-aqueous electrolyte battery system further includes: a battery voltage output section arranged to detect and output a voltage value of the non-aqueous electrolyte secondary battery; and a freezing determination section arranged to perform freezing determination to determine whether or not the non-aqueous electrolyte is in a frozen state, wherein, for the freezing determination, the freezing determination section is arranged: to execute freezing determination current control for supplying a current at a freezing determination current value which is a predetermined current value to the non-aqueous electrolyte secondary battery in a direction to charge the battery only for a freezing determination time which is a predetermined time; during execution of the freezing determination current control, to determine that the non-aqueous electrolyte is in the frozen state in response to a detection of a transition that rises once to a peak value and then decreases with time exhibited by a voltage output from the battery voltage output section; and to determine that the non-aqueous electrolyte is not in the frozen state in response to no detection that the non-aqueous electrolyte is in the frozen state.

In the non-aqueous electrolyte battery system according to the above aspect, the freezing determination current control is executed by the freezing determination section. Subsequently, when a transition of a voltage value during execution of the freezing determination current control corresponds to a transition or change that rises once to a peak value and then decreases, the non-aqueous electrolyte is determined to be in the frozen state. In the present invention, specifically, based on a detection value from the non-aqueous electrolyte secondary battery in the freezing determination, it is possible to detect the non-aqueous electrolyte is in the frozen state. In a case where the non-aqueous electrolyte of the non-aqueous electrolyte secondary battery is in the frozen state, this frozen state can be detected accurately.

DESCRIPTION OF EMBODIMENTS

A detailed description of a preferred embodiment of the present invention will now be given referring to the accompanying drawings. The present embodiment applies the invention to a lithium ion battery system having a lithium ion secondary battery.

First Embodiment

Figure 1:
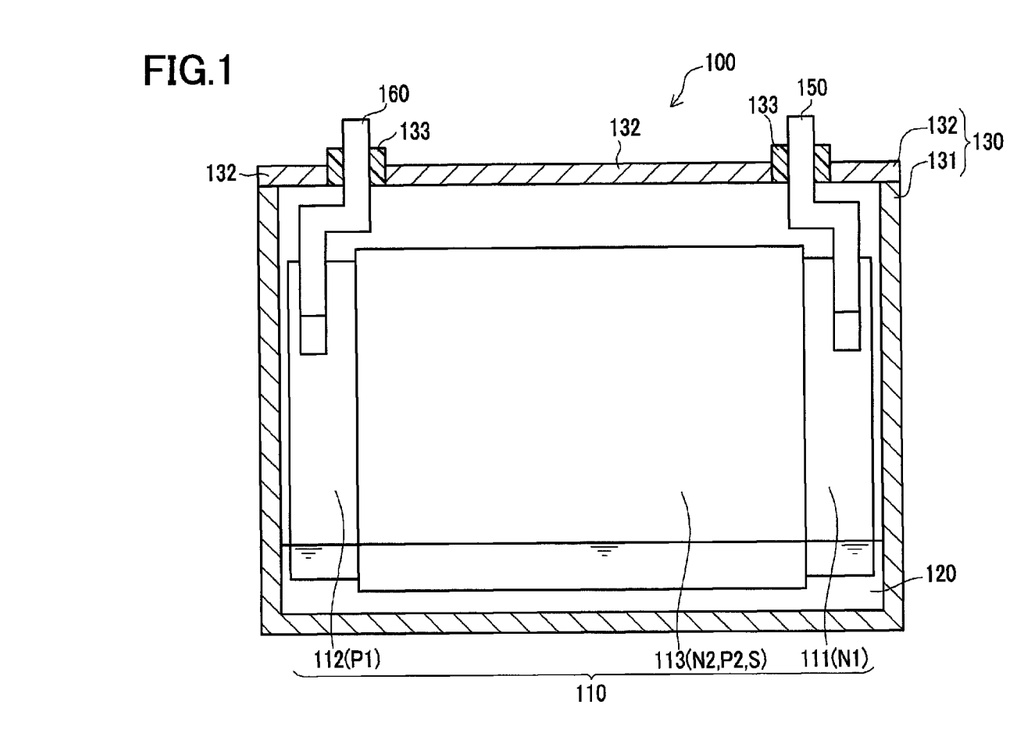
FIG. 1 is a sectional view of a non-aqueous electrolyte secondary battery in an embodiment.

FIG. 1 is a sectional view of a battery 100 in the present embodiment. The battery 100 is a lithium ion secondary battery including an electrode body 110 and an electrolyte 120 contained in a battery case 130 as shown in FIG. 1. The electrolyte 120 in this embodiment is a non-aqueous electrolyte prepared by dissolving lithium salt in an organic solvent. The battery case 130 includes a case body 131 and a closing plate 132. This closing plate 132 is provided with insulating members 133.

Figure 2:
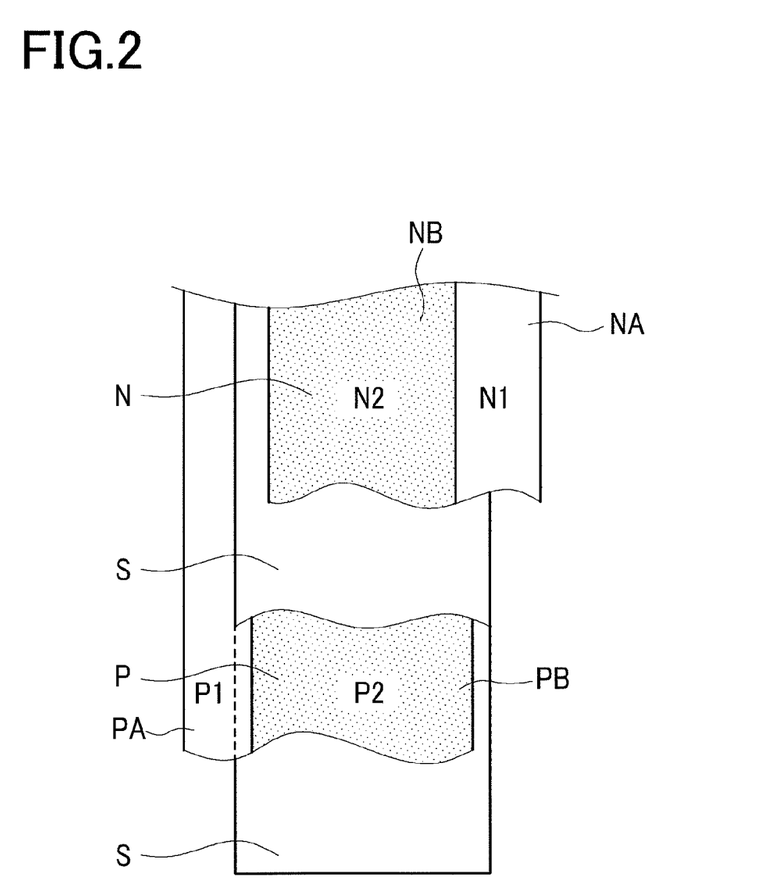
FIG. 2 is a diagram showing a positive electrode sheet, a negative electrode sheet, and separators of the non-aqueous electrolyte secondary battery in the embodiment.

FIG. 2 is a diagram showing a negative electrode sheet N, a positive electrode sheet P, and separators S, which constitute the electrode body 110. The negative electrode sheet N, positive electrode sheet P, and separators S are each a long sheet member extending in a vertical direction in FIG. 2. The electrode body 110 is configured such that the negative electrode sheet N, positive electrode sheet P, and separators S are laminated one on another as shown in FIG. 2, and wound about a winding axis extending in a lateral direction in FIG. 2 and formed into a flat shape.

Each of the negative electrode sheet N and the positive electrode sheet P consists of a current collecting foil having electrode active material layers applied on both surfaces. Specifically, as shown in FIG. 2, the negative electrode sheet N is made of a negative current collecting foil NA having negative active material layers NB formed on both surfaces thereof. The positive electrode sheet P is made of a positive current collecting foil PA having positive active material layers PB formed on both surfaces thereof. The negative current collecting foil NA is a copper foil. The positive current collecting foil PA is an aluminum foil.

The negative active material layers NB and the positive active material layers PB are each contain active material, which is a component that contributes to charge and discharge of the battery 100 and is capable of absorbing and releasing lithium ions. In the present embodiment, concretely, the negative active material layers NB contain negative active material and a binder. The positive active material layers PB contain positive active material, electrical conducting material, and a binder.

As shown in FIG. 2, the negative electrode sheet N has a negative-electrode unformed portion N1 in which the negative active material layers NB are not formed and the negative current collecting foil NA is exposed, and a negative-electrode formed portion N2 in which the negative active material layers NB are formed. Similarly, the positive electrode sheet P has a positive-electrode unformed portion P1 in which the positive active material layers PB are not formed and the positive current collecting foil PA is exposed, and a positive-electrode formed portion P2 in which the positive active material layers PB are formed. In the electrode body 110 wound as shown in FIG. 1, a right end portion 111 is a part formed of only the negative-electrode unformed portion N1 and a left end portion 112 is a part formed of only the positive-electrode unformed portion P1.

The right end portion 111 of the electrode body 110 is connected to one end of a negative terminal 150. The left end portion 112 of the electrode body 110 is connected to one end of a positive terminal 160. The other ends of the negative terminal 150 and the positive terminal 160 unconnected to the electrode body 110 are extended out of the battery case 130 through the corresponding insulating members 133.

On the other hand, a central portion 113 of the electrode body 110 in FIG. 1 is a part including the negative-electrode formed portion N2 of the negative electrode sheet N and the positive-electrode formed portion P2 of the positive electrode sheet P, which are overlapped by interposing the separators S individually as shown in FIG. 2. The battery 100 is operative to charge and discharge in the central portion 113 of the electrode body 110 through the negative terminal 150 and the positive terminal 160.

Figure 3:
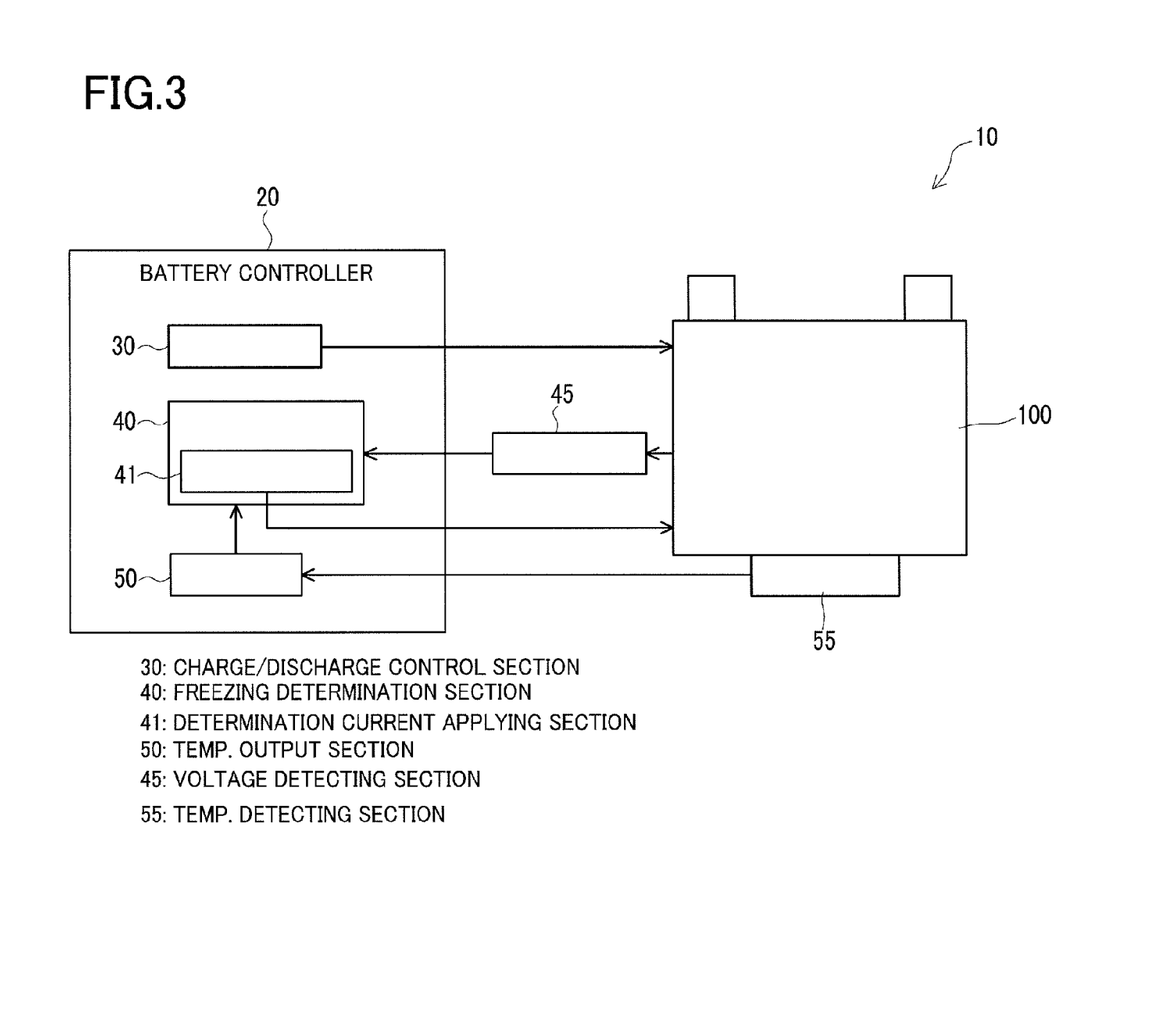
FIG. 3 is a diagram for explaining a non-aqueous electrolyte battery system in a first embodiment.

FIG. 3 shows a battery system 10 in the present embodiment including the battery 100. This battery system 10 includes a battery controller as well as the battery 100. The battery controller 20 includes a charge/discharge control section 30, a freezing determination section 40, and a temperature output section 50.

The charge/discharge control section 30 is configured to perform the charging control for controlling charging of the battery 100 and the discharging control for controlling discharging of the battery 100. For instance, when the battery system 10 is mounted in a vehicle that can run on the battery 100 serving as a drive source, the charge/discharge control section 30 controls the charge/discharge of the battery 100 according to a running condition of the vehicle.

To be concrete, for example, in response to a signal or the like from an accelerator pedal, the charge/discharge control section 30 discharges the battery 100 to drive a motor of the vehicle. During braking while running, on the other hand, the vehicle convers kinetic energy of the running vehicle to electrical energy by an electric generator. By regenerative energy produced at this time, the charge/discharge control section 30 can charge the battery 100.

Further, the charge/discharge control section 30 individually performs the charging control and the discharging control with a current value within a fixed range. To be concrete, for the charging control, the charge/discharge control section 30 in the present embodiment performs charging at a current value of 24 C or less in the C-rate defined assuming that 1 C is a current value at which the battery 100 can be charged to or discharged from a full charge capacity in one hour. The charge/discharge control section 30 also performs discharging at a current value of 24 C or less.

In order to minimize the deterioration of the battery 100, both of the charging control and the discharging control are preferably executed at a low current value. This is because the higher the current value at which the battery 100 is charged/discharged, the faster the battery 100 will deteriorate. Thus, an upper limit of the current value in the charging control and the discharging control is preferably a current on the order of 15 C.

The freezing determination section 40 is configured to perform the freezing determination for determining whether or not the electrolyte 120 of the battery 100 is in a frozen state. In the present embodiment, the frozen state of the electrolyte 120 includes a completely frozen state of the electrolyte 120 and a partially frozen state of the electrolyte 120.

Further, the freezing determination section 40 includes a determination current applying section 41 for executing freezing determination current control to apply a current to the battery 100 for the freezing determination. The determination current applying section 41 is arranged to supply a current of a freezing determination current value which is a predetermined current value to the battery 100, in a direction to charge the battery 100, in the freezing determination current control.

In the present embodiment, moreover, the freezing determination current value of the current supplied to the battery 100 by the determination current applying section 41 is a current value higher than the upper limit of the current value used by the charge/discharge control section 30 to charge the battery 100 in the charging control. Specifically, the freezing determination current value in the present embodiment is a current value higher than 24 C. The determination current applying section 41 is arranged to supply a current of a freezing determination current value to the battery 100 only for a period of freezing determination time which is a predetermined time in the freezing determination current control.

The freezing determination section 40 can also obtain a voltage value of the battery 100, which is detected and outputted by a voltage detecting section 45. To be concrete, the freezing determination section 40 can obtain a voltage value of the battery 100 detected by the voltage detecting section 45 during a period for which the determination current applying section 41 carries out the freezing determination current control. Based on this voltage value transmitted from the voltage detecting section 45, the freezing determination section 40 can determine whether or not the electrolyte 120 is frozen, namely, in the frozen state. This respect will be described later in detail.

The temperature output section 50 is configured to output a temperature index value detected by a temperature detecting section 55. The temperature index value detected by the temperature detecting section 55 is a value indicative of the temperature of the electrolyte 120 of the battery 100. As this temperature index value of the electrolyte 120, the temperature detecting section 55 in the present embodiment detects an environmental temperature, which is a surrounding temperature of the battery 100. Further, the temperature output section 50 in the present embodiment is arranged to output the temperature index value detected by the temperature detecting section 55 when the freezing determination is started. In other words, the temperature output section 50 outputs the temperature index value of the electrolyte 120 detected at the time of starting the freezing determination.

Herein, when the electrolyte 120 is in the frozen state, if the battery 100 is used in such a frozen state by charging or discharging, the performance of the battery 100 may deteriorate. Specifically, for instance, when the battery 100 with the electrolyte 120 frozen is charged by the charging control, lithium may be deposited onto the negative electrode sheet N. Such a battery 100 with the negative electrode sheet N having lithium deposited thereon is likely to cause lowering of a capacity maintenance ratio or other defects.

In the battery system 10 in the present embodiment, therefore, prior to start of charging control or discharging control by the charge/discharge control section 30, the freezing determination section 40 performs the freezing determination. Specifically, in this battery system 10, the freezing determination section 40 starts the freezing determination when the power is turned from OFF to ON.

When the electrolyte 120 is determined to be frozen by the freezing determination, the charge/discharge control section 30 in the present embodiment disables the charging control and the discharging control. In the battery system 10, accordingly, the battery 100 is neither charged nor discharged while the electrolyte 120 is in the frozen state, so that the battery performance of the battery 100 can be restrained from deteriorating.

Further, for the freezing determination, the freezing determination section 40 in the present embodiment performs the freezing determination current control by the determination current applying section 41 only when the temperature index value output from the temperature output section 50 is equal to or less than a predetermined temperature threshold value. This is because when the temperature index value is a temperature to such an extent that the electrolyte 120 does not freeze, it is presumable that the electrolyte 120 is not in the frozen state even without performing the freezing determination current control. Another reason is because when the temperature index value is higher than the predetermined temperature threshold value, the freezing determination can be executed in a short time without performing the freezing determination current control.

Since the freezing determination current control supplies a high current to the battery 100, the battery 100 is subjected to high load. For this reason, the freezing determination current control is preferably performed at a lower frequency. In the present embodiment, accordingly, the temperature threshold value is set in advance to a value indicating that the temperature of the electrolyte 120 is approximately a freezing point of the electrolyte 120.

The freezing point of the electrolyte 120 is a value varying with a charged state of the battery 100. In other words, there is a definite relationship between a SOC (State Of Charge) of the battery 100 and the freezing point of the electrolyte 120. Specifically, for a lower SOC of the battery 100, the freezing point of the electrolyte 120 tends to be a higher temperature. The temperature threshold value can be set in advance to a value indicative of the freezing point of the electrolyte 120 for the SOC 0% of the battery 100.

As the temperature threshold value, different values according to the SOC of the battery 100 may be applied. In this case, the freezing point of the electrolyte 120 for each SOC of the battery 100 is obtained in advance and the temperature threshold value is set according to the SOC of the battery 100. As an alternative, the temperature threshold value may be a value calculated by multiplying a temperature threshold value as a reference by a correction coefficient different for different SOCs of the battery 100. In a case where the value differing according to the SOC of the battery 100 is used as the temperature threshold value, it is only necessary to detect the temperature index value and also set the temperature threshold value based on the SOC of the battery 100 when the temperature index value is detected.

Next, a method for determining whether or not the electrolyte 120 is in the frozen state under the freezing determination current control for the freezing determination will be explained referring to FIG. 4. The freezing determination section 40, as explained above, determines whether or not the electrolyte 120 is in the frozen state based on the voltage value of the battery 100 during a time period for which the freezing determination current control is executed.

Figure 4:
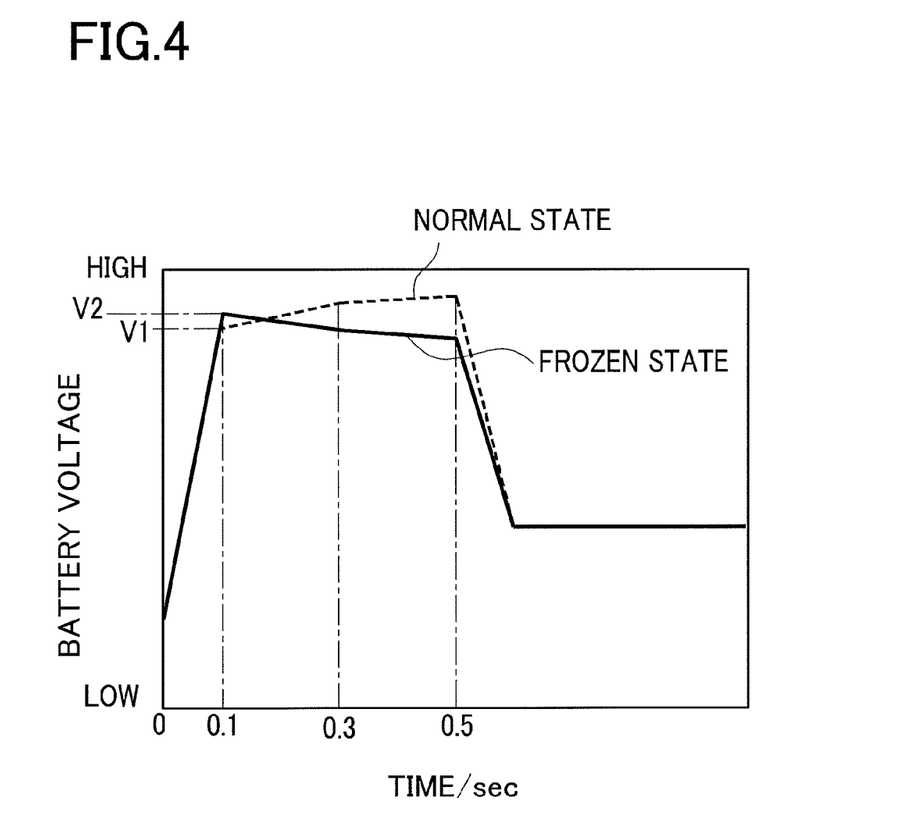
FIG. 4 is a graph showing a transition of a voltage value in a freezing determination current control.

FIG. 4 is a graph showing a transition of voltage value under the freezing determination current control representing each of a frozen state in which the electrolyte 120 is frozen and a normal state in which the electrolyte 120 is not frozen. To be concrete, FIG. 4 shows a transition of voltage value when the freezing determination current control is performed for 0.5 seconds on each of the batteries 100 in the frozen state and in the normal state, both of which have the same SOC. In FIG. 4, the freezing determination current value of a current to be supplied to the batteries 100 in the freezing determination current control is set to a current value at 25 C.

For the battery 100 in the normal state, firstly, as shown in FIG. 4, the voltage value of the battery 100 becomes V1 at an elapsed time of 0.1 seconds from the start of the freezing determination current control. The voltage value at each subsequent elapsed time of 0.3 seconds and 0.5 seconds is higher than the voltage value V1. Furthermore, the voltage value at 0.5 seconds elapsed time is higher than the voltage value at 0.3 seconds elapsed time. In the battery 100 in the normal state, specifically, the voltage value in the freezing determination current control shows a transition that rises to the voltage V1 after the start of the freezing determination current control, and then continues to gradually rise with time.

In the battery 100 in the frozen state, on the other hand, as shown in FIG. 4, the voltage value becomes V2 at an elapsed time of 0.1 seconds from the start of the freezing determination current control. The voltage value V2 is higher than the voltage value V1. The voltage value at each subsequent elapsed time of 0.3 seconds and 0.5 seconds is lower than the voltage value V2. Furthermore, the voltage value at 0.5 seconds elapsed time is lower than the voltage value at 0.3 seconds elapsed time. In the battery 100 in the frozen state, specifically, the voltage value in the freezing determination current control shows a transition that the voltage rises once to a peak value V2 after the start of the freezing determination current control, and then gradually decreases with time.

Specifically, the battery 100 in the normal state exhibits the normal transition that the voltage value in the freezing determination current control does not decrease, while the battery 100 in the frozen state exhibits the freezing transition that the voltage value in the freezing determination current control rises to a peak value and subsequently decreases. In the freezing determination in the present embodiment, therefore, when the voltage value of the battery 100 in the freezing determination current control exhibits the freezing transition shown in FIG. 4, it is determined that the electrolyte 120 is in the frozen state. On the other hand, when the voltage value of the battery 100 in the freezing determination current control exhibits the normal transition shown in FIG. 4, it is determined that the electrolyte 120 is not in the frozen state, i.e., is in an unfrozen state.

To be specific, in the freezing determination current control, for example, the voltage value is detected at each elapsed time of 0.1 seconds, 0.3 seconds, and 0.5 seconds from the start of the freezing determination current control. If each of the voltage values detected at the elapsed times of 0.1 seconds, 0.3 seconds, and 0.5 seconds decreases with time, it can be determined that the freezing transition has been exhibited by those voltage values. Specifically, in response to a detection of the freezing transition, the electrolyte 120 can be judged as being in the frozen state. On the other hand, when each of the voltage values detected at the elapsed times of 0.1 seconds, 0.3 seconds, and 0.5 seconds does not show the transition that decreases with time, i.e., in response to no detection of the freezing transition, the electrolyte 120 can be judged as not being in the frozen state.

FIG. 4 shows the result obtained using an organic solvent medium, which is a non-aqueous solvent of the electrolyte 120, prepared by mixing ethylene carbonate (EC), ethyl methyl carbonate (EMC), and dimethyl carbonate (DMC) at the following volume ratio:
EC : EMC : DMC=1:1:1.

Furthermore, FIG. 4 shows the result obtained using the electrolyte 120 prepared by adding lithium hexafluorophosphate (LiPF6) as lithium salt which is electrolyte to the foregoing mixed organic solvent to have a Li-ion concentration of 1.1 mol/l.

It is to be noted that, in the freezing determination current control in the present embodiment, even the batteries 100 each using for example any one of the following electrolytes X, Y, and Z different from the foregoing electrolyte show a similar transition to that in FIG. 4 in both the normal state and the frozen state. Further, the electrolyte used for the result shown in FIG. 4 and the following electrolytes X, Y, and Z are individually different in freezing point.
(Electrolyte X)
EC : EMC : DMC=1:1:2
Li ion concentration (LiPF6): 1.1 mol/l
(Electrolyte Y)
EC : EMC=1:1
Li ion concentration (LiPF6): 1.1 mol/l
(Electrolyte Z)
EC : EMC : DMC=1:1:1
Li ion concentration (LiPF6): 0.9 mol/l Further, FIG. 4 also shows the transition of the voltage values in the freezing determination current control executed under the condition that the environmental temperature of each battery 100 was set to −20° C. In the freezing determination current control in the present embodiment, however, the voltage values exhibit a transition similar to that shown in FIG. 4 in both of the normal state and the frozen state irrespective of the environmental temperature of each battery 100. Specifically, the battery system 10 in the present embodiment can accurately determine whether or not the electrolyte 120 is in the frozen state during execution of the freezing determination current control, irrespective of the environmental temperature of the battery 100 and the temperature of the electrolyte 120.

FIG. 4 also shows the result under the condition that the freezing determination current value in the freezing determination current control was set to a current value of 25 C. While the electrolyte 120 is in the frozen state, the higher the freezing determination current value in the freezing determination current control, the more definitely the voltage value in the freezing determination current control tends to exhibit the freezing transition. When the freezing determination current value is higher than 24 C, the voltage value tends to accurately exhibit the freezing transition. In the present embodiment, therefore, the freezing determination current value is set to a higher current value than 24 C as described above in order to enhance detection accuracy of the freezing transition in the freezing determination current control.

The result shown in FIG. 4 is obtained under the condition that a freezing determination time in the freezing determination current control was set to 0.5 seconds. However, as shown in FIG. 4, the voltage value in the freezing determination current control exhibits the transition that reaches the peak value V2 at 0.1 seconds elapsed time from the start of the freezing determination current control, and then decreases. Accordingly, the freezing determination time in the freezing determination current control may be set to less than 0.5 seconds.

However, for accurate detection of the voltage value in the freezing determination current control exhibiting the freezing transition, a longer freezing determination time is more preferable. This reason is because, the voltage value in the freezing determination current control decreases with time after reaching the peak value, and thus the longer freezing determination time enables more reliable detection that the voltage has reached the peak value and subsequently decreased. For this purpose, the freezing determination time is preferable 0.3 seconds or more. Moreover, for the purpose of more precisely detecting whether or not the electrolyte is in the frozen state, the freezing determination time of 0.5 seconds or more is conceived to be more preferable.

Figure 5:
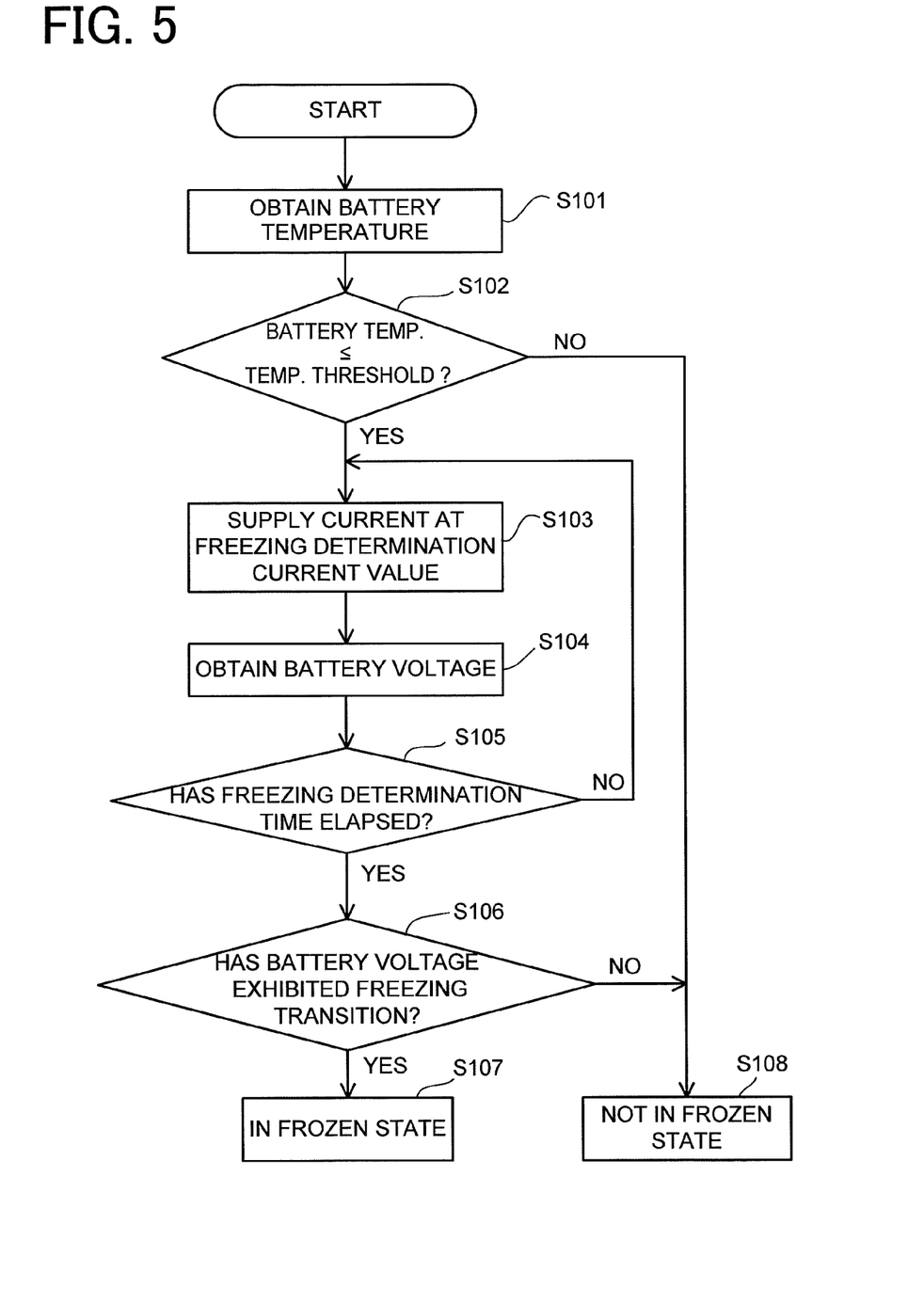
FIG. 5 is a flowchart showing a process of freezing determination in the embodiment.

Next, the process of the freezing determination in the present embodiment will be explained referring to a flowchart in FIG. 5. As described above, the freezing determination section 40 of the battery system 10 in the present embodiment performs the freezing determination when the power is turned from OFF to ON. In the freezing determination, the freezing determination section 40 first obtains the temperature index value detected by the temperature detecting section 55 at the start of the freezing determination (S101).

Successively, it is determined whether or not the obtained temperature index value is equal to or less than the temperature threshold value (S102). If the temperature index value is higher than the temperature threshold value (S102: NO), the battery is determined to be in the normal state, not in the frozen state (S108).

On the other hand, when the temperature index value is equal to or less than the temperature threshold value (S102: YES), the freezing determination current control is carried out (S103 to S105). Specifically, in the freezing determination current control, while a current is supplied at a freezing determination current value to the battery 100 by the determination current applying section 41 (S103), the voltage value of the battery 100 during that time is obtained from the voltage detecting section 45 (S104). The freezing determination current control is performed until the freezing determination time is elapsed from the start of this control (S105).

When the freezing determination current control is finished (S105: YES), it is determined whether or not the voltage value of the battery 100 in the freezing determination current control has exhibited the freezing transition that rises once up to the peak value and then decreases (S106). When the voltage value of the battery 100 in the freezing determination current control has exhibited the freezing transition (S106: YES), it is determined that the electrolyte 120 is in the frozen state (S107).

To the contrary, when the transition of the voltage value of the battery 100 in the freezing determination current control is not in the freezing transition (S106: NO), it is determined that the electrolyte 120 is not in the frozen state (S108).

When the electrolyte 120 is determined to be not in the frozen state (S108), subsequently, the charge/discharge control section 30 in the present embodiment performs the charging control and the discharging control of the battery 100 without disabling both the charging control and the discharging control.

On the other hand, when the electrolyte 120 is determined to be in the frozen state (S107), the charge/discharge control section 30 disables both the charging control and the discharging control of the battery 100. It is to be noted that, when the frozen state of the electrolyte 120 is removed after being determined to be frozen (S107), the disabled charging control and discharging control may be executed. Regarding whether or not the frozen state of the electrolyte 120 has been removed, it can be determined by the freezing determination executed again when the frozen state of the electrolyte 120 is estimated to have been removed. For this second freezing determination, for example, only the steps S103 to S108 may also be performed.

To be concrete, for example, when a fixed time has elapsed from when the electrolyte 120 is determined to be frozen (S107), indicating the frozen state might be removed, the second freezing determination can be performed (S103 to S108). Further, when the temperature index value detected by the temperature detecting section 55 becomes higher than the temperature threshold value after when the electrolyte 120 is determined to be frozen (S107), indicating the frozen state might be removed, the second freezing determination also may be conducted (S103 to S108). As an alternative, when the electrolyte is determined to be frozen (S107), heating control is conducted to heat the battery 100 from outside and, after termination of the heating control, the second freezing determination can be carried out (S103 to S108). It is of course possible to estimate the electrolyte 120 might be released from the frozen state based on any combination of the elapsed time, the temperature index value, and the heating control and perform the second freezing determination (S103 to S108).

In the battery system 10 in the present embodiment, when the electrolyte 120 is in the frozen state, the charge/discharge control section 30 can disable the charging control and the discharging control. This can suppress deterioration of the battery performance of the battery 100.

In the foregoing battery system 10, the freezing determination by the freezing determination section 40 is carried out when the power is turned from OFF to ON. The freezing determination however has only to be performed by the time of the start of the charging control or discharging control. This is because in either case the charging control and the discharging control can be disabled when the electrolyte 120 is in the frozen state.

In the foregoing battery system 10, further, when the electrolyte 120 is in the frozen state, both the charging control and the discharging control are disabled. However, in the battery 100 with the electrolyte 120 in the frozen state, the charging control tends to provide a higher load on the battery 100 as compared with the discharging control. Thus, according to the discharging control when the electrolyte 120 is in the frozen state, the battery performance of the battery 100 does not lower so much.

Therefore, the charge/discharge control section 30 may be configured to disable only the charging control and configured not to disable the discharging control when the electrolyte 120 is in the frozen state (S107). In this case where the discharging control is not disabled even through the electrolyte 120 is in the frozen state, the freezing determination is required only to be performed by the time the charging control is started. This can disable the charging control when the load on the battery 100 is large and the electrolyte 120 is in the frozen state.

The battery system 10 in the present embodiment as explained above in detail includes the battery 100 provided with the electrolyte 120, the charge/discharge control section 30 for executing the charging control and the discharging control of the battery 100, and the freezing determination section 40 for performing the freezing determination on the electrolyte 120. In the freezing determination, the freezing determination section 40 executes the freezing determination current control by causing the determination current applying section 41 to supply a current at a freezing determination current value only for a freezing determination time to the battery 100 in a direction to charge the battery 100. When the voltage value of the battery 100 in the freezing determination current control exhibits the freezing transition that rises once to the peak value and then decreases with time, the electrolyte 120 is determined to be in the frozen state. Accordingly, the non-aqueous electrolyte battery system can be achieved capable of accurately detecting the frozen state when the non-aqueous electrolyte of the non-aqueous electrolyte secondary battery is in the frozen state.

Second Embodiment

A second embodiment of the present invention will be explained below. A battery system in the second embodiment includes a temperature output section different from that of the battery system in the first embodiment. To be specific, the temperature output section of the battery system in the present embodiment is arranged to output a lower limit of the temperature index values during the non-use period in which both the charging control and the discharging control are not performed.

Figure 6:
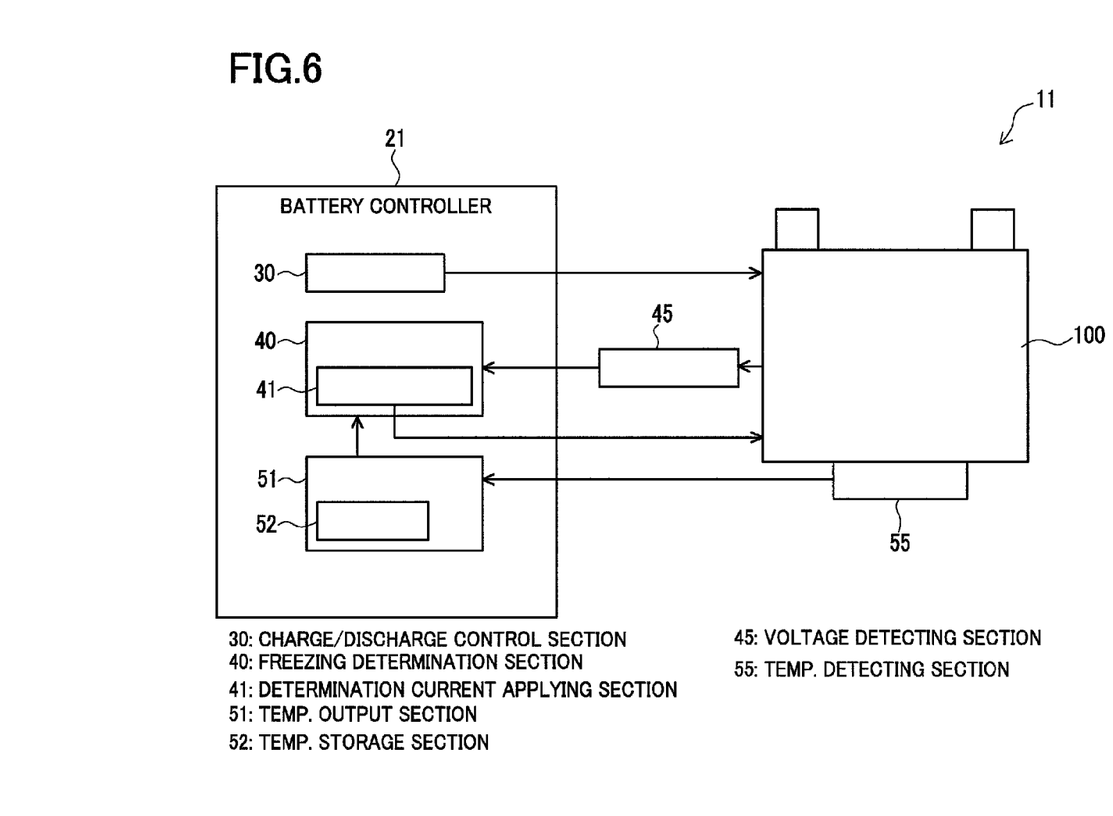
FIG. 6 is a diagram for explaining a non-aqueous electrolyte battery system in a second embodiment.

FIG. 6 is a diagram to explain a battery system 11 in the present embodiment. As shown in FIG. 6, this battery system 11 also includes the battery 100 identical to that in the first embodiment. A battery controller 21 includes the charge/discharge control section 30 and the freezing determination section 40 which are identical to those in the first embodiment. The voltage detecting section 45 and the temperature detecting section 55 are also identical to those in the first embodiment.

The battery controller 21 includes a temperature output section 51 different from that of the first embodiment. The temperature output section 51 includes a temperature storage section 52. This temperature storage section 52 is configured to store a temperature index value detected by the temperature detecting section 55. Specifically, the temperature storage section 52 stores a temperature index value detected by the temperature detecting section 55 during a non-use period in which both the charging control and the discharging control are not performed by the charge/discharge control section 30. Further, at the start of the freezing determination, the temperature output section 51 outputs a lower limit of the temperature index values stored in the temperature storage section 52.

The freezing determination section 40 in the present embodiment also performs the freezing determination in the same process as that in the first embodiment. Specifically, the freezing determination is carried out as explained referring to the flowchart of FIG. 5. However, the temperature output section 51 in the present embodiment outputs a lower limit of the temperature index values during the non-use period as explained above. In the freezing determination, accordingly, the freezing determination section 40 in the present embodiment obtains, at step S101, the temperature index value different from that in the first embodiment.

In the freezing determination in the present embodiment, specifically, when the lower limit of the temperature index values during the non-use period is equal to or less than the temperature threshold value (S102: YES), the freezing determination current control is executed (S103 to S105). When the voltage in the freezing determination current control exhibits the freezing transition (S106: YES), the electrolyte is determined to be in the frozen state (S107).

When the voltage value in the freezing determination current control does not exhibit the freezing transition (S106: NO), the electrolyte is determined to be not in the frozen state (S108). Alternatively, when the lower limit of the temperature index values during the non-use period is higher than the temperature threshold value (S102: NO), the electrolyte is determined to be not in the frozen state (S108).

Herein, even when the environmental temperature of the battery 100 is not greater than the freezing point of the electrolyte 120, the electrolyte 120 is less likely to freeze as long as the battery 100 is operated under the charging control or the discharging control. In other words, freezing of the electrolyte 120 is apt to occur during the non-use period in which both the charging control or the discharging control of the battery 100 are not performed. In particular, if a power supply of the battery system 11 remains OFF, the non-use period may become long.

In the battery system 11, therefore, even when the non-use period ends and the environmental temperature enabling operation of the battery 100 is high, the electrolyte 120 having frozen during the non-use period may remain frozen without being unmelted. In the battery system 11 in the present embodiment, when the lower limit of the temperature index values during the non-use period is not greater than the temperature threshold value as mentioned above, the freezing determination current control is carried out. Specifically, in the battery system 11 in the present embodiment, if the battery 100 is placed in an environment in which freezing may occur during that non-use period, whether or not the electrolyte 120 is in the frozen state can be accurately determined by the freezing determination.

If the non-use period is long, even when the environmental temperature of the battery 100 is not greater than the freezing point of the electrolyte 120 at an initial stage of the non-use period, the environmental temperature of the battery 100 may become higher than the freezing point of the electrolyte 120 at a later stage. In this case, the electrolyte 120 having frozen at the initial stage of the non-use period may be melted by the end of the non-use period.

When the non-use period of the battery 100 is long, therefore, the temperature output section 51 may be arranged to output the lower limit of the temperature index values detected at the later stage of the non-use period, from among the temperature index values stored in the temperature storage section 52. To be specific, the temperature output section 51 for example may output the lower limit detected in a fixed period before the end of the non-use period, from among the temperature index values during the non-use period stored in the temperature storage section 52.

This is because in a case where the electrolyte 120 having frozen at the initial stage of the non-use period is melted by the end of the non-use period, the freezing determination can be executed without performing the freezing determination current control. The freezing determination can specifically be finished in a short time. This further makes it possible to reduce the frequency at which high current is supplied to the battery 100 in the freezing determination current control, thereby reducing load on the battery 100.

In the battery system 11 in the present embodiment, as explained above in detail, the temperature output section 51 includes the temperature storage section 52 for storing the temperature index values detected during the non-use period of the battery 100. The temperature output section 51 outputs the lower limit of the temperature index values of the non-use period stored in the temperature storage section 52. The freezing determination section 40 can perform the freezing determination based on the lower limit of the temperature index values of the non-use period. Accordingly, when the battery 100 is placed in an environment in which freezing may occur during the non-use period, the freezing determination can accurately determine whether or not the electrolyte 120 is in the frozen state. Specifically, there is achieved the non-aqueous electrolyte battery system capable of accurately detecting the frozen state when the non-aqueous electrolyte of the non-aqueous electrolyte secondary battery is in the frozen state.

The foregoing embodiments are mere examples and give no limitation to the invention. Thus, the invention may be embodied in other specific forms without departing from the essential characteristics thereof. For instance, any of the above embodiments describe the battery system having a single battery 100. However, the invention may also be applied to a non-aqueous electrolyte battery system having a battery assembly including a plurality of non-aqueous electrolyte secondary batteries that are connected in series or in parallel to each other. For example, the electrode body 110 of the battery 100 may be formed as not only a flat shaped wound body but also a cylindrical shaped wound body or a laminated body having electrode sheets stacked without being wound. The invention may be of course applied to a non-aqueous electrolyte battery system provided with another non-aqueous electrolyte as well as the electrolyte exemplified as above.

Furthermore, the foregoing non-aqueous electrolyte battery system preferably includes the temperature output section arranged to detect and output the temperature index value indicative of the temperature of the non-aqueous electrolyte, in which the freezing determination section is arranged for the freezing determination to execute the freezing determination current control when the temperature index value output from the temperature output section before start of the freezing determination current control is equal to or less than the predetermined temperature threshold value, and to determine that the non-aqueous electrolyte is not in the frozen state when the temperature index value output from the temperature output section is higher than the temperature threshold value. When the temperature index value is higher than the temperature threshold value, it is possible to presume that the non-aqueous electrolyte is not in the frozen state. Further, when the temperature index value is higher than the temperature threshold value, it is possible to determine that the electrolyte is not in the frozen state without performing the freezing determination current control. Therefore, for the temperature index value higher than the temperature threshold value, the freezing determination can be finished in a short time.

In the foregoing non-aqueous electrolyte battery system, preferably, the temperature output section is configured to include the temperature storage section which stores the temperature index value detected during the period in which both the charging control and the discharging control are not executed, and to output the lower limit of the temperature index values stored in the temperature storage section. The non-aqueous electrolyte having frozen during the non-use period in which both the charging control and the discharging control are not executed may remain unmelted and frozen even when the temperature index value is high after the non-use period ends and thus the non-aqueous electrolyte secondary battery can be operated. Even in such a case, using the lower limit of the temperature index values in the non-use period enables accurate freezing determination to be executed.

In the foregoing non-aqueous electrolyte battery system, preferably, the freezing determination section is configured to perform the freezing determination before execution of the charging control, and the charge/discharge control section is configured to disable the charging control when the freezing determination section determines that the non-aqueous electrolyte is in the frozen state and not to disable the charging control when the freezing determination section determines that that the non-aqueous electrolyte is not in the frozen state. This is because when the non-aqueous electrolyte is in the frozen state, the non-aqueous electrolyte secondary battery may be subjected to a high load by the charging control.

In the foregoing non-aqueous electrolyte battery system, preferably, the freezing determination section is configured to perform the freezing determination before execution of the discharging control as well as before execution of the charging control, and the charge/discharge control section is configured to disable both the charging control and the discharging control when the freezing determination section determines that the non-aqueous electrolyte is in the frozen state and not to disable both the charging control and the discharging control when the freezing determination section determines that the non-aqueous electrolyte is not in the frozen state. This is because when the non-aqueous electrolyte is in the frozen state, the non-aqueous electrolyte secondary battery may also be subjected to a load even by the discharging control.

In the foregoing non-aqueous electrolyte battery system, preferably, the freezing determination current value is a current value higher than an upper limit of a current value of a current supplied to the non-aqueous electrolyte secondary battery by the charging control. When the non-aqueous electrolyte secondary battery is in the frozen state, as the freezing determination current value is higher, the voltage during execution of the freezing determination current control more clearly exhibits the transition that rises once to a peak value and then decreases. Since the freezing determination current value is higher than the upper limit of the current value supplied by the charging control, the freezing determination can be accurately achieved.

In the foregoing non-aqueous electrolyte battery system, preferably, the freezing determination current value is a higher current value than 24 C. When the non-aqueous electrolyte secondary battery is in the frozen state, the freezing determination current value is set to a higher current value than 24 C, so that the voltage during the freezing determination current control more clearly exhibits the transition that rises once to a peak value and subsequently decreases.

In the foregoing non-aqueous electrolyte battery system, preferably, the freezing determination time is equal to or more than 0.5 seconds. When the non-aqueous electrolyte secondary battery is in the frozen state, the freezing determination time is set to 0.5 seconds or more, so that the voltage during the freezing determination current control more definitely exhibits the transition that increases once to a peak value and then lowers.

REFERENCE SIGNS LIST 10, 11 Battery system
30 Charge/discharge control section
40 Freezing determination section
41 Determination current applying section
45 Voltage detecting section
100 Battery
120 Electrolyte

What is claimed is:
1. A non-aqueous electrolyte battery system including:
 a non-aqueous electrolyte secondary battery provided with a non-aqueous electrolyte; and
 a charge/discharge control section configured to execute charging control for controlling charging of the non- aqueous electrolyte secondary battery and discharging control for discharging of the non-aqueous electrolyte secondary battery,
wherein the non-aqueous electrolyte battery system further includes:
a battery voltage output section arranged to detect and output a voltage value of the non-aqueous electrolyte secondary battery; and
a freezing determination section arranged to perform freezing determination to determine whether or not the non-aqueous electrolyte is in a frozen state,
wherein, for the freezing determination, the freezing determination section is arranged:
to execute freezing determination current control for supplying a current at a freezing determination current value which is a predetermined current value to the non-aqueous electrolyte secondary battery in a direction to charge the battery only for a freezing determination time which is a predetermined time;
during execution of the freezing determination current control,
to determine that the non-aqueous electrolyte is in the frozen state in response to a detection of a transition that rises once to a peak value and then decreases with time exhibited by a voltage output from the battery voltage output section; and
to determine that the non-aqueous electrolyte is not in the frozen state in response to no detection that the non-aqueous electrolyte is in the frozen state.

2. The non-aqueous electrolyte battery system according to claim 1, further including a temperature output section arranged to detect and output a temperature index value indicative of a temperature of the non-aqueous electrolyte,
wherein, for the freezing determination, the freezing determination section is arranged:
to execute the freezing determination current control when the temperature index value output from the temperature output section before start of the freezing determination current control is equal to or less than a predetermined temperature threshold value; and
to determine that the non-aqueous electrolyte is not in the frozen state when the temperature index value output from the temperature output section is higher than the temperature threshold value.

3. The non-aqueous electrolyte battery system according to claim 2,
wherein the temperature output section is configured:
to include a temperature storage section which stores a temperature index value detected during a period in which both the charging control and the discharging control are not executed; and
to output a lower limit of the temperature index values stored in the temperature storage section.

4. The non-aqueous electrolyte battery system according to claim 1,
wherein the freezing determination section is configured to perform the freezing determination before execution of the charging control, and
wherein the charge/discharge control section is configured:
to disable the charging control when the freezing determination section determines that the non-aqueous electrolyte is in the frozen state; and
not to disable the charging control when the freezing determination section determines that the non-aqueous electrolyte is not in the frozen state.

5. The non-aqueous electrolyte battery system according to claim 2,
wherein the freezing determination section is configured to perform the freezing determination before execution of the charging control, and
wherein the charge/discharge control section is configured:
to disable the charging control when the freezing determination section determines that the non-aqueous electrolyte is in the frozen state; and
not to disable the charging control when the freezing determination section determines that the non-aqueous electrolyte is not in the frozen state.

6. The non-aqueous electrolyte battery system according to claim 3,
wherein the freezing determination section is configured to perform the freezing determination before execution of the charging control, and
wherein the charge/discharge control section is configured:
to disable the charging control when the freezing determination section determines that the non-aqueous electrolyte is in the frozen state; and
not to disable the charging control when the freezing determination section determines that the non-aqueous electrolyte is not in the frozen state.

7. The non-aqueous electrolyte battery system according to claim 4,
wherein the freezing determination section is configured to perform the freezing determination before execution of the discharging control as well as before execution of the charging control, and
wherein the charge/discharge control section is configured:
to disable both the charging control and the discharging control when the freezing determination section determines that the non-aqueous electrolyte is in the frozen state; and
not to disable both the charging control and the discharging control when the freezing determination section determines that the non-aqueous electrolyte is not in the frozen state.

8. The non-aqueous electrolyte battery system according to claim 5,
wherein the freezing determination section is configured to perform the freezing determination before execution of the discharging control as well as before execution of the charging control, and
wherein the charge/discharge control section is configured:
to disable both the charging control and the discharging control when the freezing determination section determines that the non-aqueous electrolyte is in the frozen state; and
not to disable both the charging control and the discharging control when the freezing determination section determines that the non-aqueous electrolyte is not in the frozen state.

9. The non-aqueous electrolyte battery system according to claim 6,
wherein the freezing determination section is configured to perform the freezing determination before execution of the discharging control as well as before execution of the charging control, and
wherein the charge/discharge control section is configured:

to disable both the charging control and the discharging control when the freezing determination section determines that the non-aqueous electrolyte is in the frozen state; and not to disable both the charging control and the discharging control when the freezing determination section determines that the non-aqueous electrolyte is not in the frozen state.

10. The non-aqueous electrolyte battery system according to claim 1, wherein the freezing determination current value is a current value higher than an upper limit of a current value of a current supplied to the non-aqueous electrolyte secondary battery by the charging control.

11. The non-aqueous electrolyte battery system according to claim 1, wherein the freezing determination current value is a current value higher than 24 C.

12. The non-aqueous electrolyte battery system according to claim 1, wherein the freezing determination time is equal to or more than 0.5 seconds.

* * * * *